United States Patent
Lohrenz et al.

(10) Patent No.: US 9,442,565 B2
(45) Date of Patent: Sep. 13, 2016

(54) SYSTEM AND METHOD FOR DETERMINING DISTRACTING FEATURES IN A VISUAL DISPLAY

(75) Inventors: Maura C Lohrenz, Marion, MA (US); Marlin L Gendron, Long Beach, MS (US); Melissa R. Beck, Baton Rouge, LA (US); Megin Murphy, legal representative, Long Beach, MS (US); Linda Burns, legal representative, Long Beach, MS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 659 days.

(21) Appl. No.: 13/592,500

(22) Filed: Aug. 23, 2012

(65) Prior Publication Data
US 2013/0050268 A1 Feb. 28, 2013

Related U.S. Application Data

(60) Provisional application No. 61/526,808, filed on Aug. 24, 2011.

(51) Int. Cl.
| | |
|---|---|
| *G09G 5/00* | (2006.01) |
| *G06F 3/01* | (2006.01) |
| *G06F 3/0481* | (2013.01) |
| *G06T 3/40* | (2006.01) |

(52) U.S. Cl.
CPC .......... *G06F 3/013* (2013.01); *G06F 3/0481* (2013.01); *G06F 2203/04806* (2013.01); *G06T 3/40* (2013.01); *G09G 2340/0407* (2013.01); *G09G 2340/0414* (2013.01)

(58) Field of Classification Search
CPC .......... G09G 2340/0407; G09G 2340/0414; G06T 3/40; G06F 3/0481

USPC ........ 345/156, 660, 473, 158; 382/103, 225, 382/117; 351/209, 239, 210, 246, 243, 203, 351/212

See application file for complete search history.

(56) References Cited

U.S. PATENT DOCUMENTS

| | | | |
|---|---|---|---|
| 5,341,181 A | 8/1994 | Godard | |
| 6,106,119 A | 8/2000 | Edwards | |
| 6,218,965 B1 * | 4/2001 | Gendron et al. | ............ 701/409 |
| 6,333,994 B1 * | 12/2001 | Perrone | ............ G06K 9/222 |
| | | | 382/181 |
| 6,447,396 B1 * | 9/2002 | Galyean, III | ......... A63F 13/12 |
| | | | 348/552 |
| 6,677,886 B1 * | 1/2004 | Lok | ........................ 342/26 R |
| 7,120,880 B1 * | 10/2006 | Dryer | ................. G06Q 30/02 |
| | | | 715/831 |
| 7,567,714 B2 * | 7/2009 | Gendron et al. | ............ 382/225 |
| 7,764,840 B2 * | 7/2010 | Gendron et al. | ............ 382/225 |
| 8,401,248 B1 * | 3/2013 | Moon | ............ G06Q 30/0242 |
| | | | 382/103 |

(Continued)

OTHER PUBLICATIONS

Beck, M.R., Lohrenz, M.C., Trafton, J.G. (2010) Measuring Search Efficiency in Complex Visual Search Tasks: Global and Local Clutter, Journal of Experimental Psychology: Applied, 16(3), pp. 238-250.

(Continued)

*Primary Examiner* — Abderrahim Merouan
(74) *Attorney, Agent, or Firm* — US Naval Research Laboratory; Scott G. Bell

(57) ABSTRACT

System and method for analyzing multiple participants' eye-movements over a visual display to determine which features on the display universally attract the most attention, or are the most distracting.

19 Claims, 9 Drawing Sheets

(56) References Cited

U.S. PATENT DOCUMENTS

| | | | |
|---|---|---|---|
| 8,654,390 B1* | 2/2014 | Chi .......................... G03C 9/02 348/59 |
| 2004/0101212 A1* | 5/2004 | Fedorovskaya et al. ..... 382/305 |
| 2004/0103111 A1* | 5/2004 | Miller et al. .................. 707/102 |
| 2005/0105768 A1* | 5/2005 | Yang et al. .................... 382/103 |
| 2006/0009955 A1* | 1/2006 | Gendron et al. ................ 703/2 |
| 2006/0093998 A1 | 5/2006 | Vertegaal |
| 2007/0057945 A1* | 3/2007 | Olson ........................... 345/424 |
| 2007/0088714 A1* | 4/2007 | Edwards et al. ................ 707/10 |
| 2009/0024964 A1* | 1/2009 | Kantamneni ................ 715/854 |
| 2009/0172540 A1* | 7/2009 | Jung et al. ................... 715/706 |
| 2009/0279807 A1* | 11/2009 | Kanamorl ............ G06T 7/0055 382/274 |
| 2010/0033333 A1* | 2/2010 | Victor et al. .................. 340/576 |
| 2010/0103246 A1 | 4/2010 | Schwerdtner et al. |
| 2010/0174586 A1 | 7/2010 | Berg, Jr. et al. |
| 2010/0239170 A1* | 9/2010 | Asnis ........................... 382/190 |
| 2011/0043617 A1 | 2/2011 | Vertegaal et al. |
| 2011/0178967 A1* | 7/2011 | Delp ............................... 706/20 |
| 2011/0270213 A1 | 11/2011 | Peterson et al. |
| 2012/0078623 A1 | 3/2012 | Vertegaal et al. |
| 2012/0146891 A1 | 6/2012 | Kalinli |
| 2012/0259638 A1* | 10/2012 | Kalinli .................... G10L 15/25 704/270 |
| 2012/0316793 A1* | 12/2012 | Jung et al. ....................... 702/19 |
| 2014/0063054 A1* | 3/2014 | Osterhout et al. ............ 345/633 |

OTHER PUBLICATIONS

Beck, M.R., Lohrenz, M.C., Trafton, J.G. & Gendron, M.L. (2008) The role of local and global clutter in visual search.(Abstract Only) Journal of Vision, May 10, 2008, 8(6), Article 1071.

Lohrenz, M.C. and Gendron, M.L., (2008) A 3D clustering algorithm to model clutter in electronic geospatial displays, Journal of Management and Engineering Integration, 1(2), pp. 83-88.

Lohrenz, M.C., Trenchard, M., Myrick, S., Van Zuyle, P. & Fechtig, S. (1997) Optimizing cockpit moving-map displays for enhanced situational awareness. Chapter 13 in Situational awareness in the tactical air environment: Augmented proceedings of the Naval Air Warfare Center's first annual symposium, CSERIAC, Wright-Patterson AFB, OH, pp. 363-387.

Najemnick, J., & Geisler, W.S.,(2008) Eye movement statistics in humans are consistent with an optimal search strategy, Journal of Vision, 8(3):4, pp. 1-14, Mar. 6.

Ottes, F.P., Van Gisbergen, J.A. & Eggermont, J.J. (1985) Latency dependence of colour-based target vs nontarget discrimination by the saccadic system. Vision Research, 25(6), pp. 849-862.

Findlay, J.M., (1997). Saccade target selection during visual search. Vision Research, 37(5), pp. 617-631.

Reddy, L. & Van Rullen, R.(2007) Spacing affects some but not all visual searches: Implications of theories of attention and crowding, Journal of Vision, 7(2):3, pp. 1-17.

Rosenholtz, R., Li, Y., Mansfield, J. & Jin, Z (2005) Feature congestion: A measure of display clutter. CHI, Portland, OR, ACM 1-58113-998/5/05/0004, Apr. 2-7.

Rosenholtz, R., Li, Y., & Nakano, L.(2007) Measuring visual clutter, Journal of Vision, 7(2), 1-22.

Rosenholtz, R., Li, Y. Nakano, L. (2005) Feature Congestion 1.0: A Measure of Visual Clutter, Journal of Vision, ISSN 1534-7362, pp. 1-15.

Schons, V. & Wickens, C. (1993) Visual separation and information access in aircraft display layout, University of Illinois Institution of Aviation Technical Report ARL-93-7/NASA-A3I-93-1, Savoy, IL, August.

Wolfe, J.M., (1998) What can 1 million trials tell us about visual search? Psychological Science, 9(1), 33-39, January.

Lohrenz, M.C., & Beck, M.R.,(2011) Clutter avoidance in complex geospatial displays, 2011 Naval Research Laboratory Review, Information Technology and Communications, pp. 167-169.

Lohrenz, M.C. (2003) Cognitive issues related to advanced cockpit displays: Supporting the transition between internal and external guidance. Thesis submitted for the degree of Master of Science in Aeronautics and Astronautics at the Massachusetts Institute of Technology, June.

Lohrenz, M.C., Trafton, J.G, Beck, M.R. & Gendron, M.L. (2009) A model of clutter for complex, multivariate, geospatial displays. The Journal of the Human Factors and Ergonomics Society, 51(1), pp. 90-101, February.

Lohrenz, M.C., Beck, M.R., Trafton, J.G. & Gendron, M.L.(2008) Measurement and Analysis of Clutter in Electronic Displays. 2008 Naval Research Labortory Information and Technology Review, pp. 163-165.

Lohrenz, M.C., Trafton, J.G., Beck, M.R., (2008) Clearing up the Clutter. The Defense Management Journal (41), Ebenezer House, Staffordshire, UK, pp. 167-169.

Lohrenz, M.C.& Beck, M.R. (2010) Evidence of clutter avoidance in complex scenes. Proceedings of the 54th Annual Human Factors and Ergonomics Society (HFES) meeting, San Francisco, Sep. 27-Oct. 1, pp. 1355-1359.

Lohrenz, M.C.& Beck, M.R. (2010) Evidence of clutter avoidance in complex scenes. Proceedings of the 54th Annual Human Factors and Ergonomics Society (HFES) meeting, Slide/Power Point Presentation. San Francisco. Sep. 27-Oct. 1.

Beck, M.R., Lohrenz, M.C., Trafton, J.G. & Gendron, M.L.(2008) The role of local and global clutter in visual search. Poster presented at the Vision Sciences Society meeting, Naples, FL. May 9-14.

Gendron, M.L, Lohrenz, M.C., (2008) A 2-D clustering algorithm to aid mine-warfare analysts in determining navigable lanes over cluttered seafloors. Journal of Management & Engineering Integration 1(2), 28-34. December.

U.S. Appl. No. 61/526,808, filed Aug. 24, 2011, System and Method for Determining Distracting Features in a Visual Display, Maura Connor Lohrenz, et al.

* cited by examiner

SYSTEM AND METHOD FOR DETERMINING DISTRACTING FEATURES IN A VISUAL DISPLAY

CROSS-REFERENCE TO RELATED APPLICATIONS

This Application is a non-provisional application claiming priority to provisional application 61/526,808 filed on Aug. 24, 2011, under 35 USC 119(e). The entire disclosure of the provisional application is incorporated herein by reference.

BACKGROUND

Methods and systems disclosed herein relate generally to display features that could be distracting. Most eye-trackers come equipped with software to analyze the eye-movements of individual participants, including fixations and saccades (eye movements between fixations). What is needed is a method that combines and compiles fixations of multiple participants.

SUMMARY

The system and method of the present embodiment analyze multiple participants' eye-movements (specifically, fixations) over a visual display (e.g., anything displayed on a computer screen) to determine which features on the display universally attract the most attention, or are the most distracting. Eye movement data are generally recorded by an eye-tracking device as either fixations (when visual attention is focused on an item in the field of view) or saccades (when there is eye movement—and therefore a change in visual attention—from one fixation to another). A saccade is detected when eye movement velocity is more than a predetermined speed (e.g., 30 degrees of visual angle per second), and a fixation is detected when eye movement velocity is less than that speed. When a region of interest is fixated upon (which subtends approximately 2 degrees of visual angle), that region is brought into focus and, the observer may be attending to and attempting to perceive and understand the information there. By recording and then clustering many observers' fixations over a common display, the regions of the display that are universally attracting people's attention can be analyzed.

DETAILED DESCRIPTION

Figure 1:
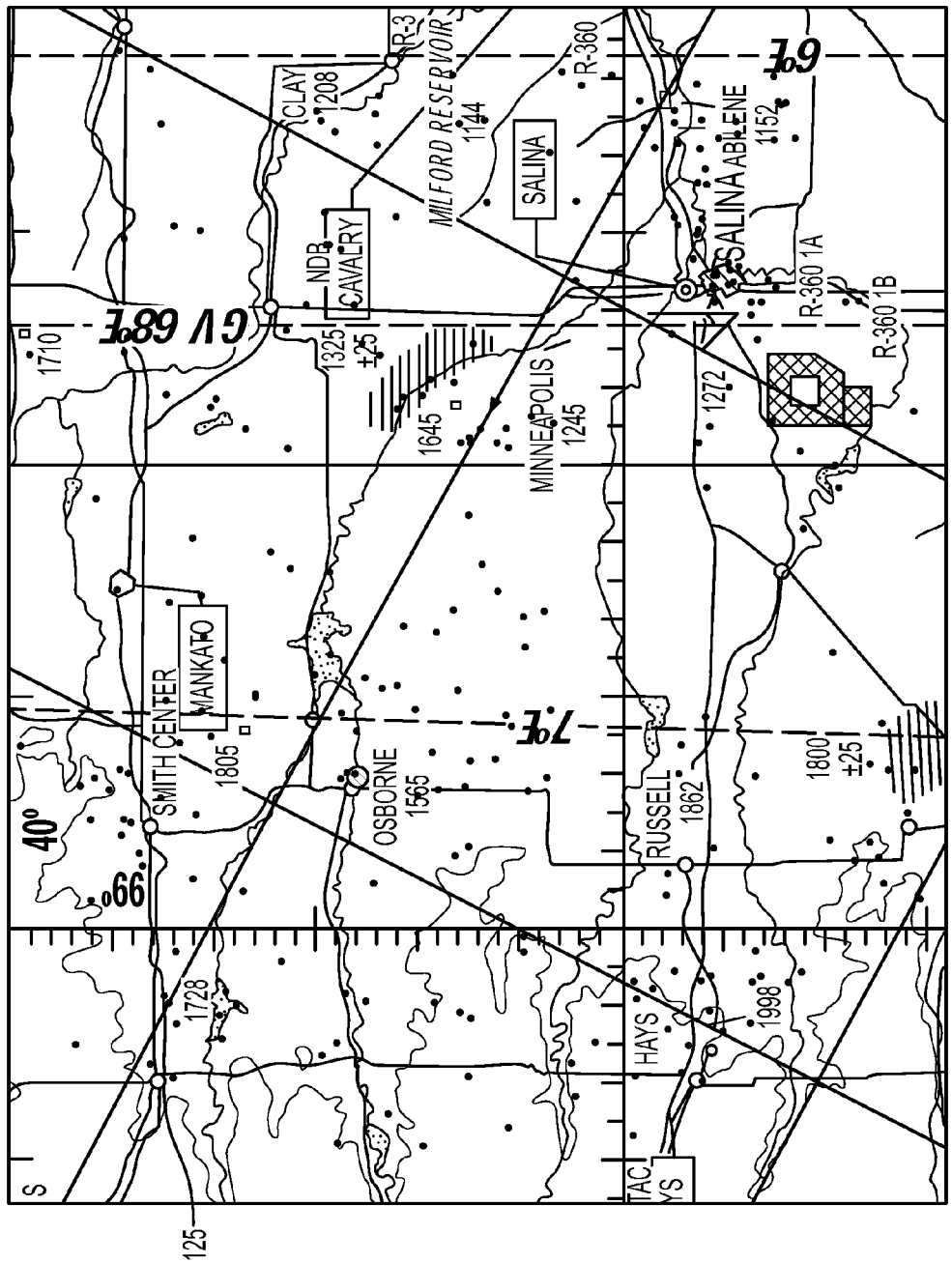
FIG. 1 is a pictorial representation of a digital aeronautical chart overlaid with locations of fixations from 24 participants.

The problems set forth above as well as further and other problems are solved by the present teachings. These solutions and other advantages are achieved by the various embodiments of the teachings described herein below.

The invention is a computer system and method for determining distracting features on an electronic visual display. The system and method cluster multiple observers' fixations, and track various information for each fixation, including (as a minimum) the screen location (X and Y) of the fixation and a unique index number representing the participant who made the fixation. Any other information that was measured in association with the fixation can also be tracked. Counts, averages, standard deviations, and other statistical analyses of the information for each cluster of fixations can be determined. This additional information could include, but is not limited to including, the length (dwell time) of the clustered fixations, the direction and length of previous or following saccades, the amount of clutter immediately surrounding the fixation (as measured by various clutter models), and the average salience of features immediately surrounding the fixation (as measured by various saliency models). The system and method of the present embodiment can be used to filter all the fixation clusters by number of observers, such that only clusters containing at least a pre-selected minimum number (or a maximum number, for a given display) of observers' fixations are analyzed. One method of viewing the resulting clusters is to save them as shapefiles and view/analyze them with ARCINFO® or ARCGIS®.

In the present embodiment, fixations for twenty-four observers are included. The following fixations can be, but are not required to be, excluded from clustering: (1) first fixation for each observer/map (center point fixation); (2) all fixations after each observer completed any assigned tasks (e.g., if this was a target detection task, omit all fixations after the observer detected the target); and (3) all fixations for a trial suspected of eye-tracker drift. Clusters are created using, for example, but not limited to, a circular expansion of size five pixels (diameter=10 pix, or 0.5° visual angle). Thus, in the present embodiment, the furthest that two fixations could be separated and still be clustered together would be 0.5°. Clusters containing fixations from at least a pre-selected number of different observers, for example, but not limited to, six or 25% of the observer pool in the exemplary configuration, are shown. In this example, the largest number of observers that were represented in a single cluster was six. After removing the smallest clusters (with, for example, but not limited to, <6 observers' fixations), a border of pre-selected pixel width, for example, but not limited to, fifteen pixels, is added to the remaining clusters, resulting in a minimum of a forty pixel diameter (2° visual angle) per cluster, to make it easier to see what feature is being viewed. All values denoted as "pre-selected" could be constant, computed, retrieved from electronic storage, or user-selected, for example.

Referring now to FIG. 1, an exemplary chart is shown upon which the method of the present embodiment is pictorially illustrated. In this example, all fixations 125 for twenty-four observers are included, except (1) the first fixation for each observer/map (center point fixation), (2) all fixations after each observer completed an assigned task (e.g., clicking on a randomly placed target feature, not shown in this image), and (3) all fixations for a trial suspected of eye-tracker drift.

Figure 2:
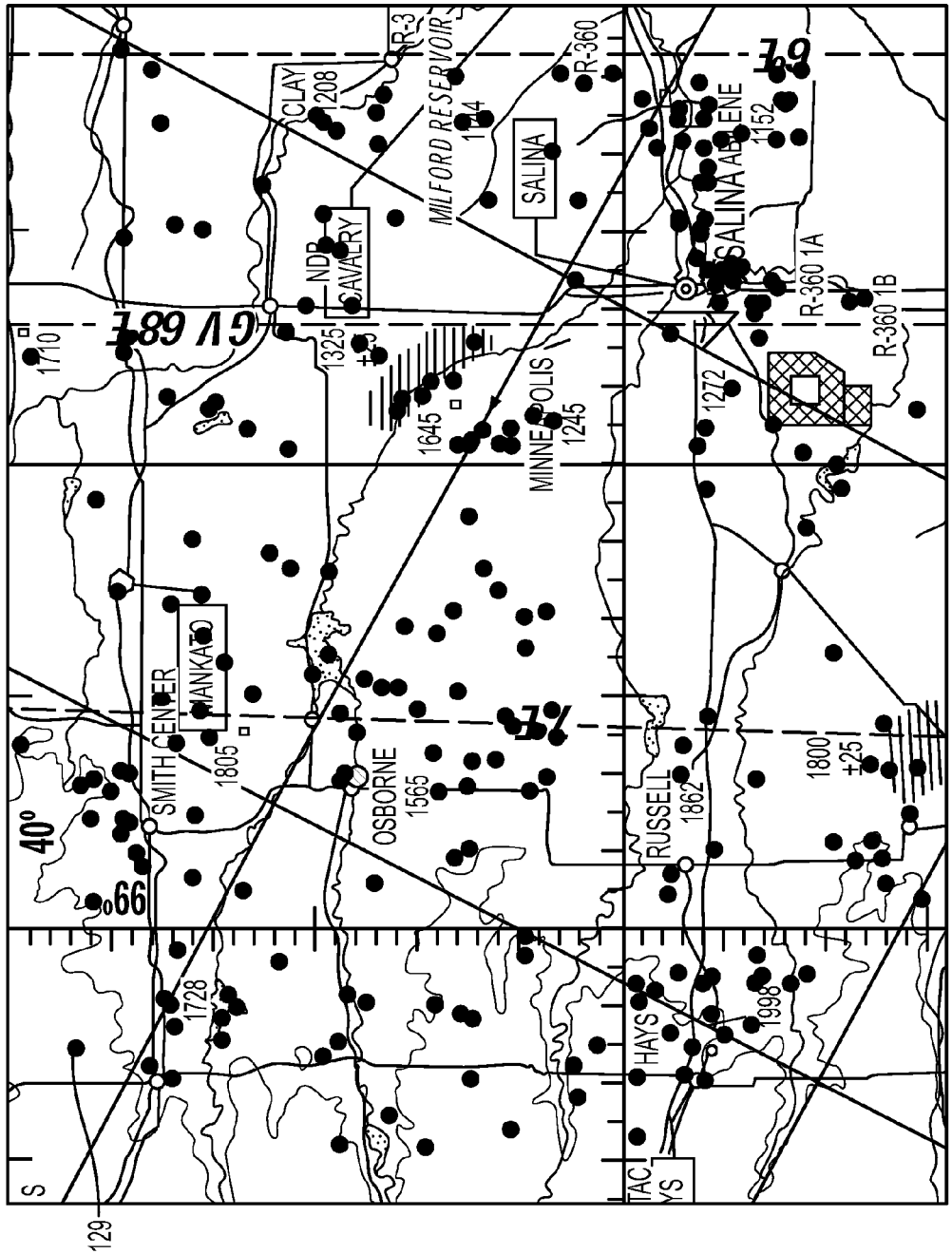
FIG. 2 is the chart of FIG. 1 with all fixations within 0.5° visual angle of each other clustered together.

Referring now to FIG. 2, all fixations 125 (FIG. 1) within 0.5° visual angle of each other are clustered together. In the present embodiment, clusters 129 are created using a circular expansion of size 5 (diameter=10 pix, or 0.5° visual angle). Thus, the farthest that two fixations 125 (FIG. 1) are separated and still be clustered together is 0.5°.

Figure 3:
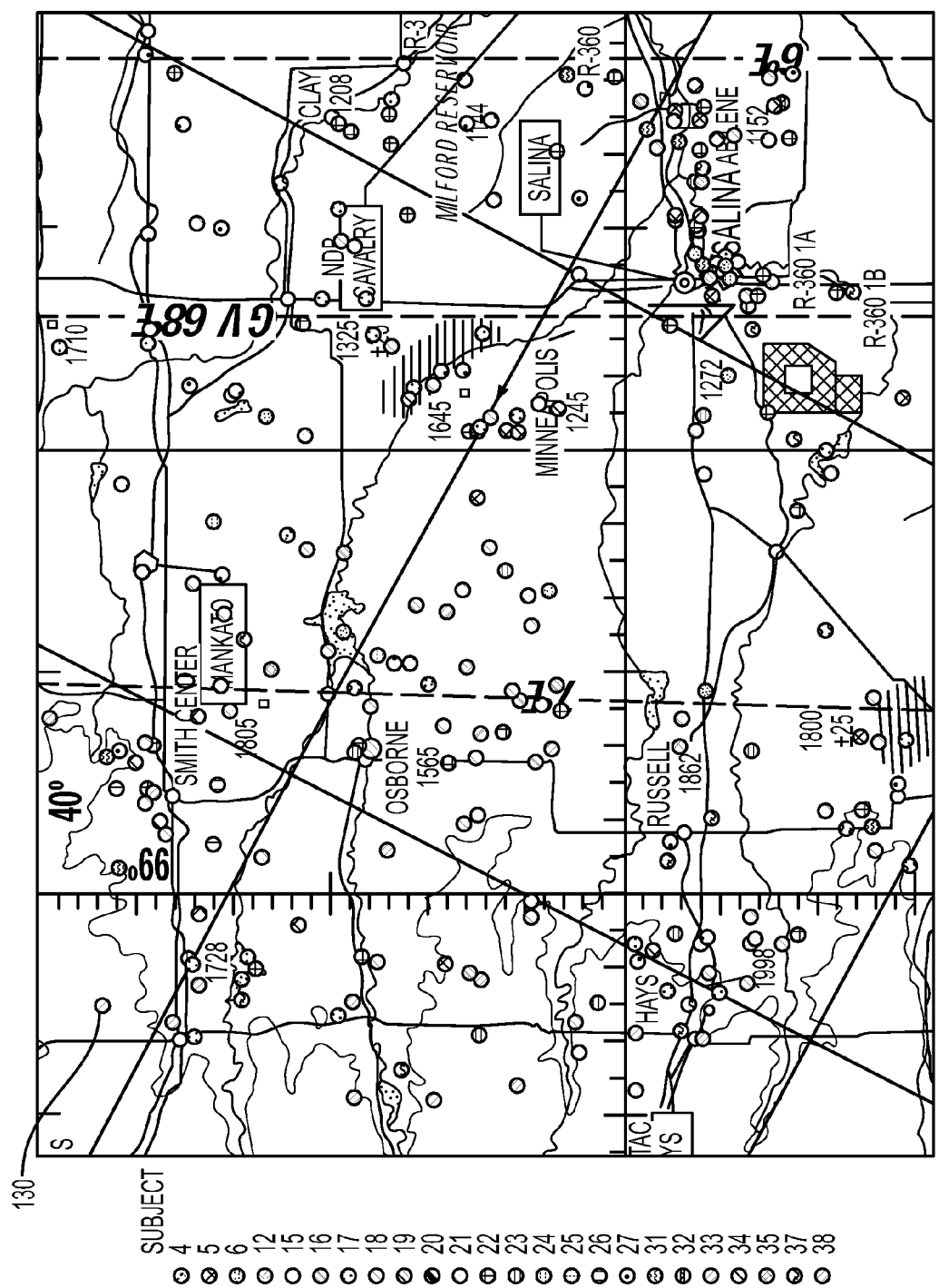
FIG. 3 is the chart of FIG. 1 showing fixations color-coded by participant.
Figure 8:
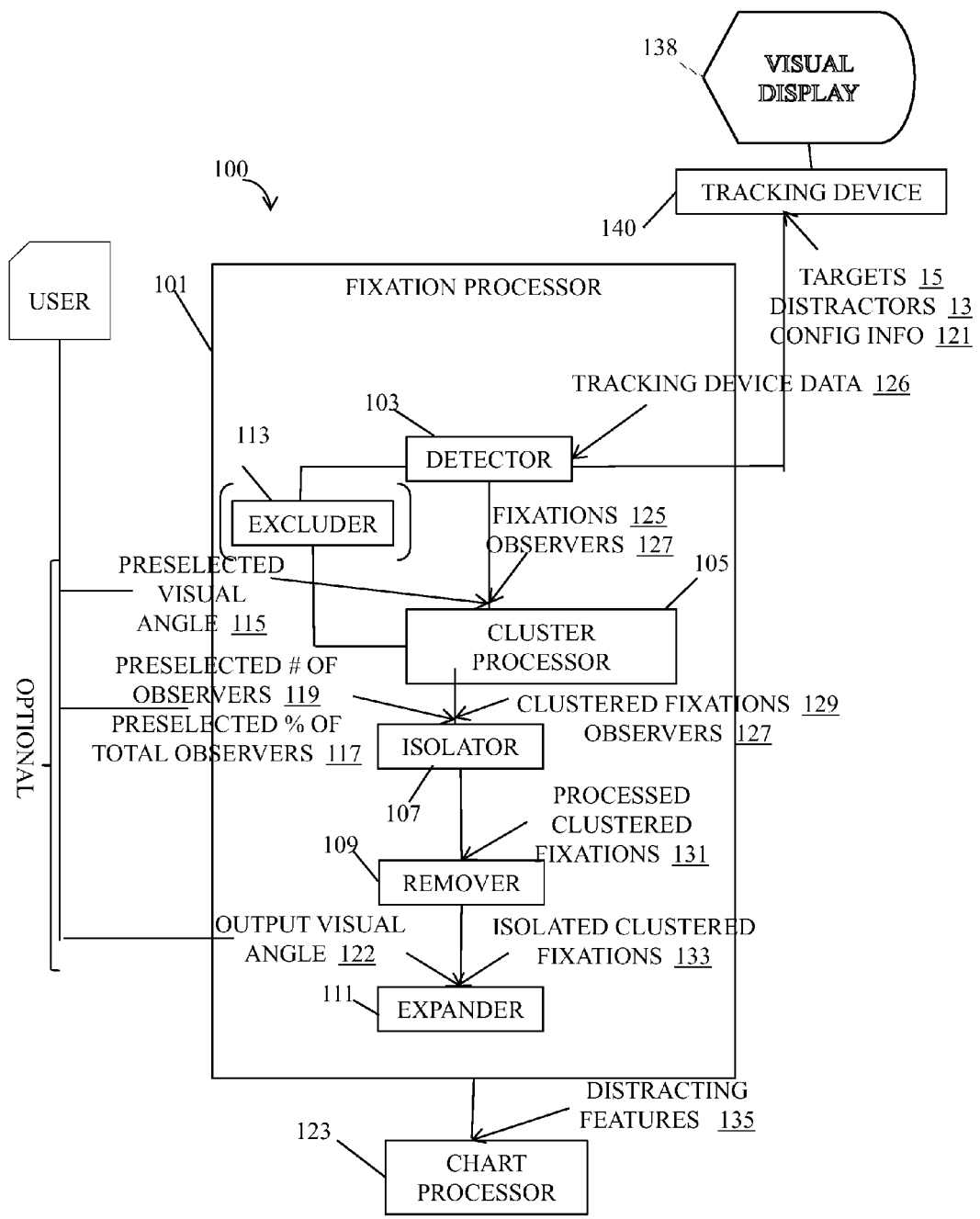
FIG. 8 is a schematic block diagram of the system of the present embodiment.

Referring now to FIG. 3, clusters 129 (FIG. 2) are shown with color-coded fixations 130, color-coded by observer 127 (FIG. 8). Only clusters 129 (FIG. 2) containing fixations 125 (FIG. 1) from at least six different observers 127 (FIG. 8) (25% of the observer pool) are retained.

Figure 4:
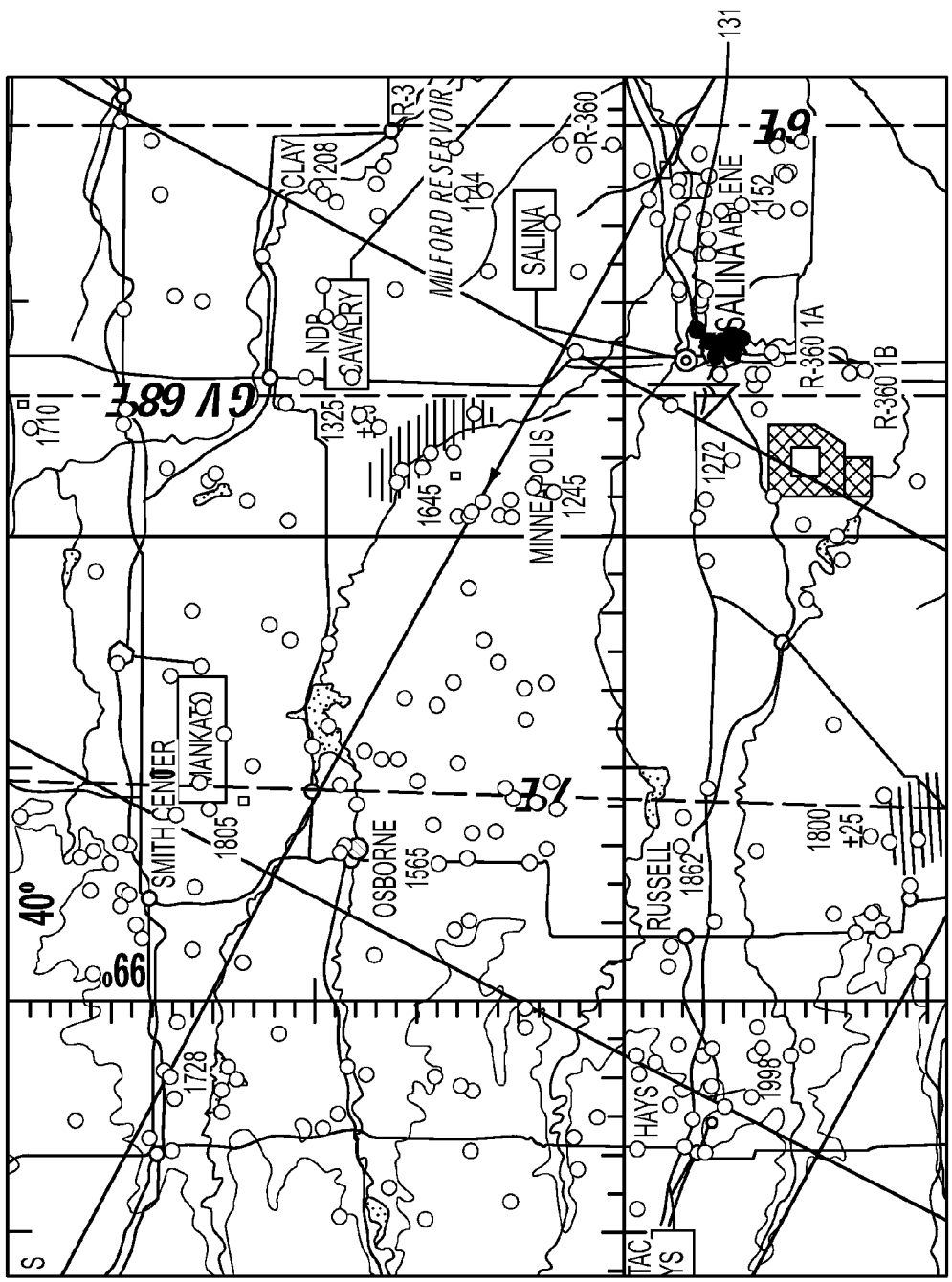
FIG. 4 is the chart of FIG. 1 with the "most visited" cluster of fixations highlighted and all other clusters grayed out.

Referring now to FIG. 4, only one processed clustered fixation 131 has fixations 125 (FIG. 1) from at least six different observers.

Figure 5:
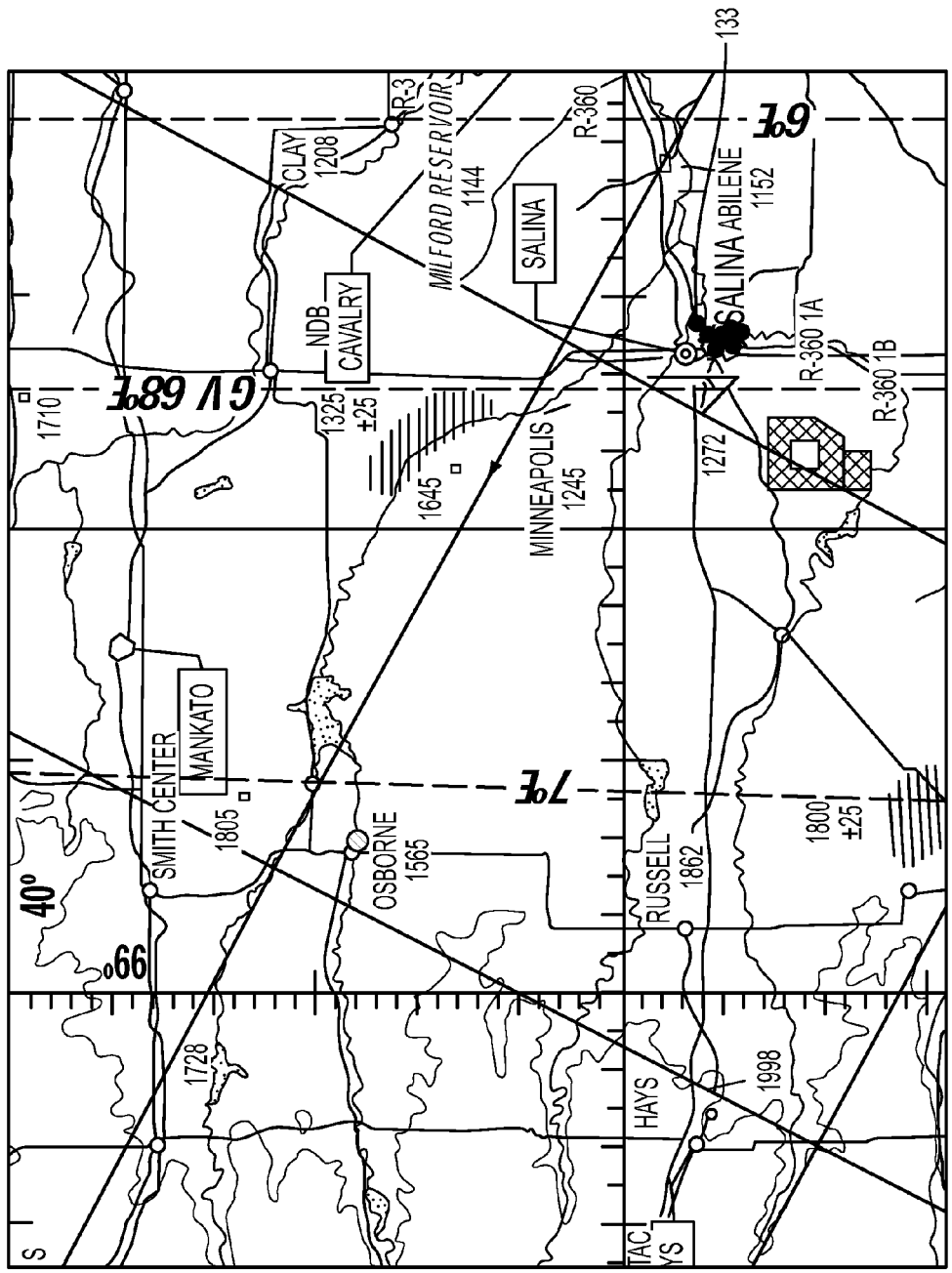
FIG. 5 is the chart of FIG. 1 with only the "most visited" cluster of fixations plotted thereon.

Referring now to FIG. 5, the smallest of clusters 129 (FIG. 2) (with fewer than six different observers' fixations) have been removed. In the present embodiment, a fifteen-pixel border is added to the remaining of clusters 129 (FIG. 2), resulting in a minimum forty-pixel diameter (2° visual angle) per isolated clustered fixation 133, to make it easier to see the feature that is viewed by the observers.

Figure 6:
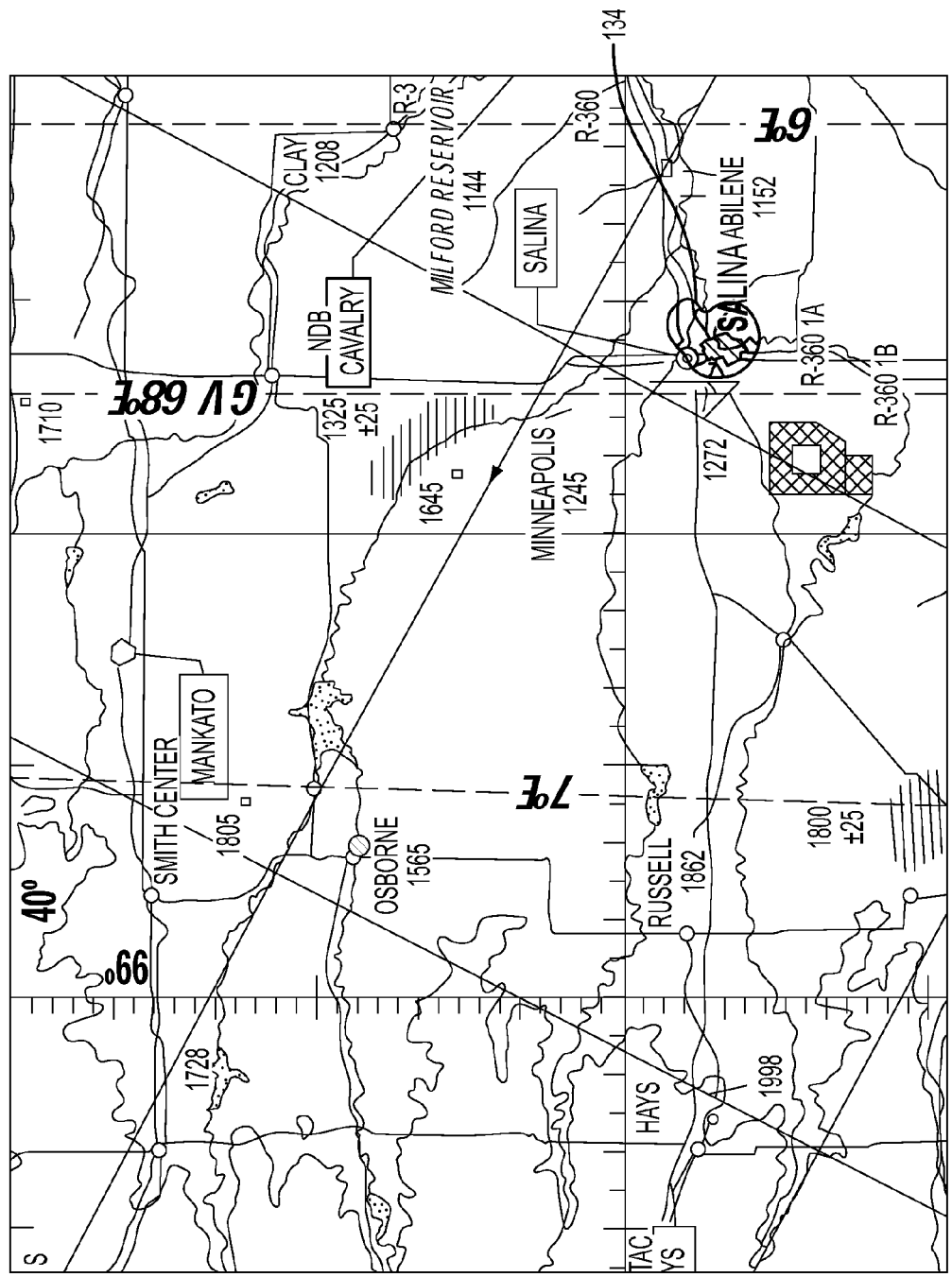
FIG. 6 is the chart of FIG. 1 with the "most visited" cluster expanded to represent at least 2° of visual angle, revealing the most distracting feature of the chart (the red town)

Referring now to FIG. 6, the underlying chart 134 of FIG. 1 corresponding to the isolated clustered fixation 133 (FIG. 5), which became the subject of most observers' fixations, as isolated by the method of the present embodiment is shown.

Figure 7:
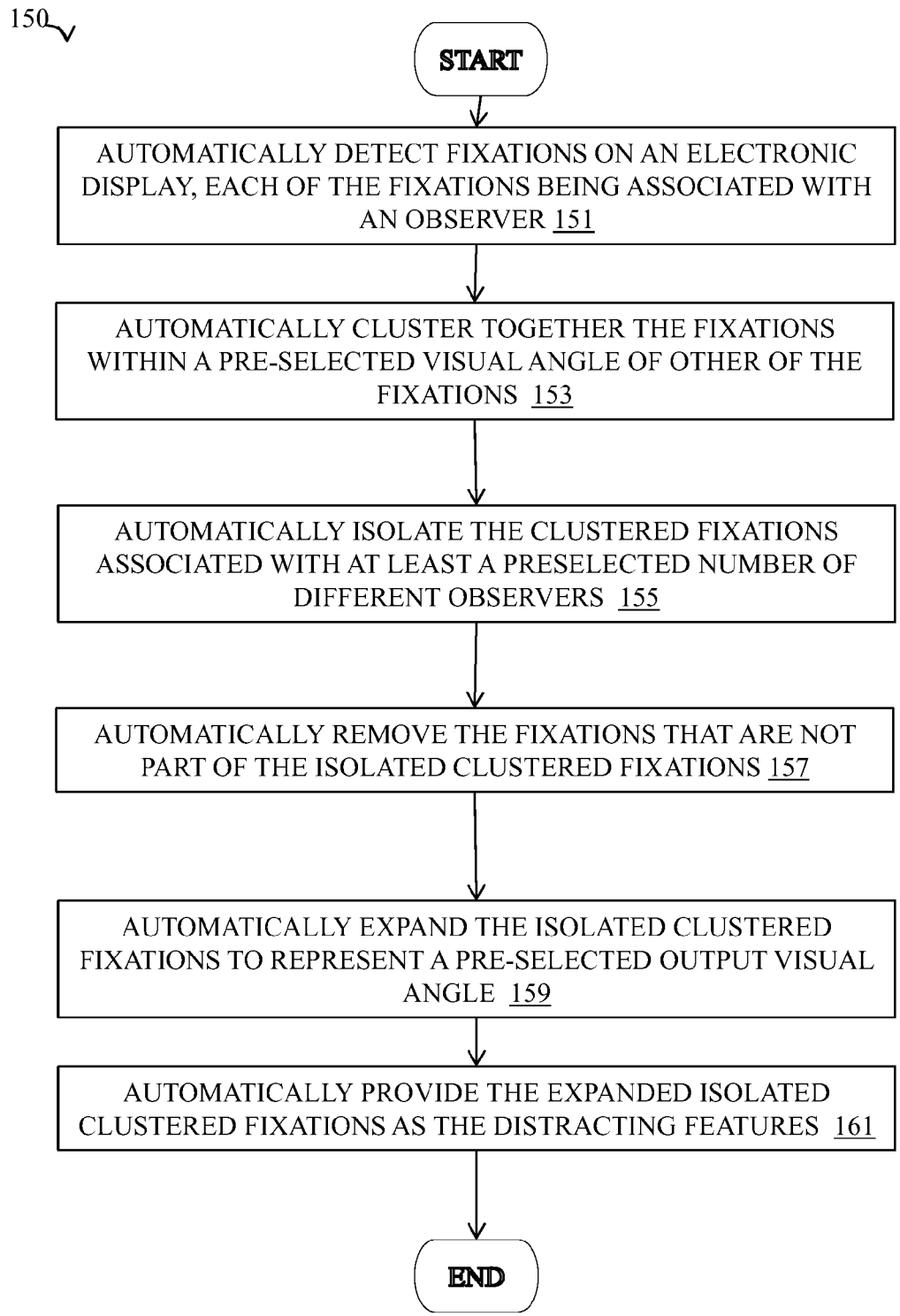
FIG. 7 is a flowchart of the method of the present embodiment.

Referring now to FIG. 7, method 150 for analyzing multiple observers' fixations, recorded by an eye-tracker, over a visual display to determine distracting features, can include, but is not limited to including, the steps of automatically detecting 151 fixations on an electronic display, each of the fixations being associated with an observer, automatically clustering 153 together the fixations within a pre-selected visual angle of other of the fixations, automatically isolating 155 the clustered fixations associated with at least a preselected number of different observers, automatically removing 157 the fixations that are not part of the isolated clustered fixations, automatically expanding 159 the isolated clustered fixations to represent a pre-selected output visual angle, and automatically providing 161 the expanded isolated clustered fixations as the distracting features. The pre-selected visual angle can optionally be user-selected. The pre-selected number of different observers can optionally be a pre-selected percentage of the total number of the observers. The pre-selected output visual angle can optionally be user-selected. The step of detecting fixations can include, but is not limited to including, the step of configuring an electronic automated device for detecting the fixations. Optionally, method 150 can include the step of planting targets and distractors on the display. Method 150 can optionally include the step of excluding predetermined fixations, where the predetermined fixations can include, but are not limited to including, the first fixation in each trial, the fixations following the successful completion of some task, the fixations deemed to be affected by drift of the eye tracking device, and fixations over specified features. The step of expanding can include, but is not limited to including, the step of adding a border of pre-selected pixel width to the isolated clustered fixations. The pre-selected pixel width can optionally be user-selected.

Optional steps can include (1) while forming each cluster, automatically calculating and maintaining a running summation and count of various measureable parameters associated with each fixation in each cluster, including, but not limited to including, (a) the number of unique observers represented by the fixations in each cluster; (b) the duration (in milliseconds) of each of the fixations in each cluster; (c) the index (i.e., location in time, per trial) of each fixation in each cluster; (d) any other measureable, user-specified parameters associated with each fixation in each cluster; (2) after forming each cluster, automatically calculating the final number of unique observers represented by the fixations in each cluster; and standard statistical measures (e.g., minimum, maximum, average, median, mode, standard deviation, etc.) for each measurable parameter calculated for the fixations in each cluster; and (3) automatically providing the clustered fixation statistics for each distracting feature.

The method of the present embodiment could be implemented as executable computer code configured with, for example, but not limited to: (1) default values for clustering resolution, e.g. 10, and the clustering radius, e.g. 5 (such that 2 points would be clustered together if they are 10 (or fewer) pixels apart); (2) the location of the fixations input file; (3) the location in which are to be written the output files, e.g. shapefiles; (4) a flag to indicate whether a) exact point locations are used or b) point locations are "snapped" to the nearest grid location, based on a preset resolution; (5) the resolution (in pixels) if the previous flag is set to "snap" to a grid; and (6) a flag to indicate whether or not to smooth the cluster boundaries, which a) would compress the final cluster file and b) might in some cases (e.g., for very complex cluster boundaries) produce cleaner, less jagged-looking cluster boundaries. The executable computer code could be invoked with parameters such as, for example, but not limited to, (1) a unique identifier per fixation; (2) the screen coordinates of the fixation; (3) the observer's identifier; (4) the fixation length (amount of time fixated, in milliseconds); and (5) the average clutter and saliency of the region immediately surrounding the fixation (e.g., 2° of visual angle centered on the fixation point).

Referring now to FIG. 8, system 100 for analyzing multiple observers' fixations, recorded by tracking device 140, over a visual display 138 to determine distracting features 135, can include, but is not limited to including, fixation processor 101 including, but not limited to, detector 103 automatically detecting, from tracking device data 126, fixations 125 on visual display 138, each fixation 125 being associated with one of a plurality of observers 127, cluster processor 105 automatically clustering together fixations 125 within pre-selected visual angle 115 of other of fixations 125, isolator 107 automatically isolating clustered fixations 129 associated with at least preselected number 119 of different observers 127, remover 109 automatically removing fixations 125 that are not part of processed clustered fixations 131, expander 111 automatically expanding isolated clustered fixations 133 to represent pre-selected output visual angle 122, expander 111 automatically providing to chart processor 123 expanded isolated clustered fixations as distracting features 135. Pre-selected visual angle 115 can optionally be user-selected. Pre-selected number 119 of different observers 127 can optionally be pre-selected percentage 117 of the total number of the observers 127. Pre-selected output visual angle 115 can optionally be user-selected. Detector 103 can optionally provide configuration information 121 to tracking device 140 for detecting fixations 125. Detector 103 can also plant targets 15 and distractors 13 on the display. Optionally, excluder 113 can exclude predetermined of fixations 125, where the predetermined of fixations 125 can include, but are not limited to including, the first of fixations 125 in each trial, fixations 125 following the successful completion of a task, fixations 125 deemed to be affected by drift of tracking device 140, and fixations 125 over specified features. Expander 111 can optionally add a border of pre-selected pixel width to isolated clustered fixations 133. The pre-selected pixel width can optionally be user-selected.

Figure 9:
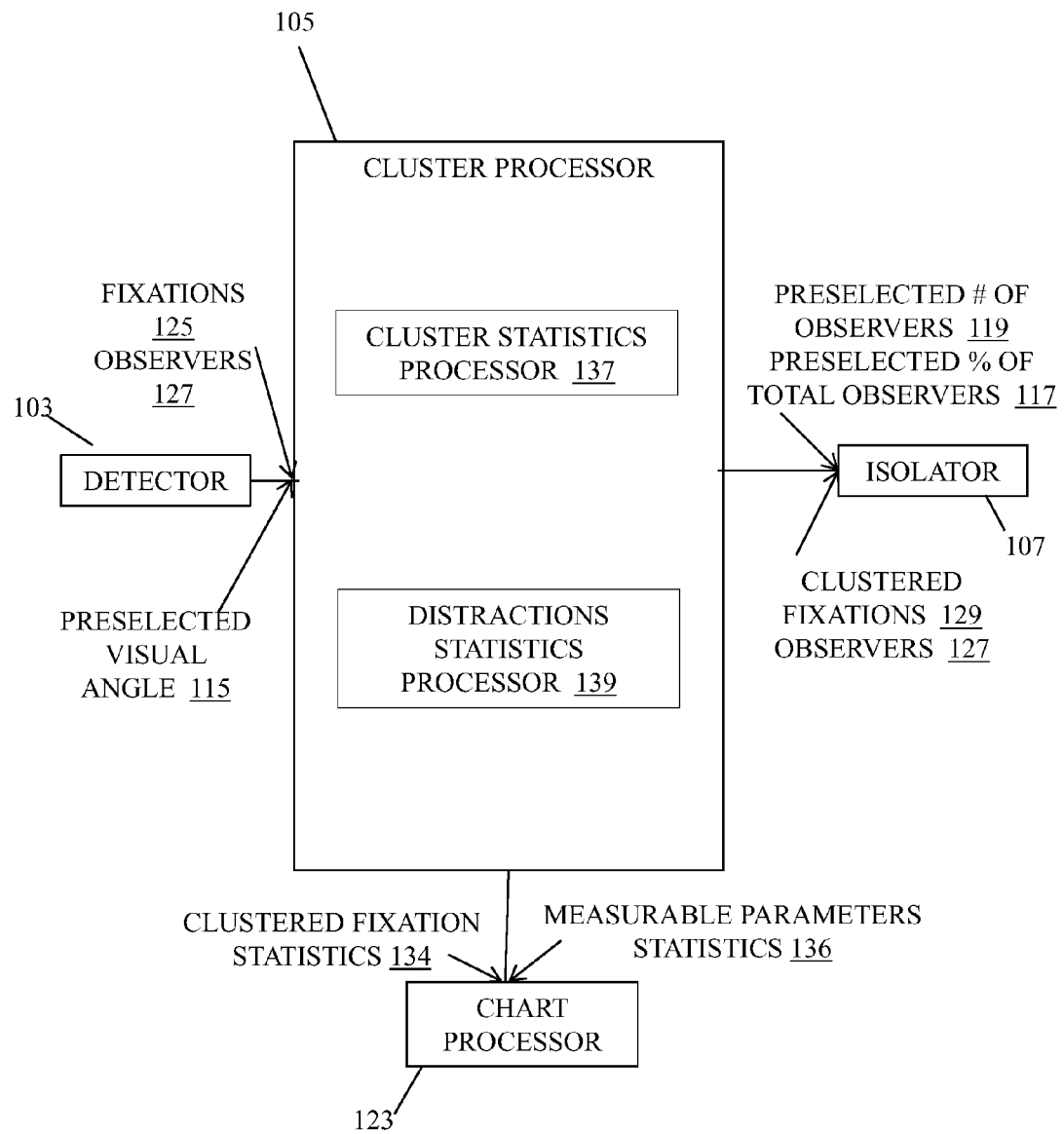
FIG. 9 is a schematic block diagram of the cluster processor of the present embodiment.

Referring now to FIG. 9, cluster processor 105 can include, but is not limited to including, cluster statistics processor 137 automatically calculating and maintaining measureable parameters statistics 136 associated with each fixation 125 in each of clustered fixations 129, including, but not limited to including, (a) the number of unique observers 127 represented by fixations 125 in each of clustered fixations 129; (b) the duration (in milliseconds) of each of the fixations 125 in each of clustered fixations 129; (c) the index (i.e., location in time, per trial) of each fixation 125 in each of clustered fixations 129; (d) any other measureable, user-specified parameters associated with each fixation 125 in each of clustered fixations 129; (2) after forming each of clustered fixations 129, automatically calculating the final number of unique of observers 127 represented by fixations 125 in each of clustered fixations 129; and standard statistical measures (e.g., minimum, maximum, average, median, mode, standard deviation, etc.) for each measurable parameter calculated for the fixations 125 in each of clustered fixations 129. Cluster processor 105 can also include distractions statistics processor 139 automatically providing the clustered fixation statistics 134 for each distracting feature 135.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in Fortran and C. The system operates on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on a different computer. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIG. 7, method 150 can be, in whole or in part, implemented electronically. Signals representing actions taken by elements of system 100 (FIG. 8) and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer method for analyzing multiple observers' fixations, recorded by an eye-tracker, over a visual display to determine distracting features, comprising the steps of:
   using the eye-tracker to detect fixations of a plurality of observers on an electronic display, each of the fixations being associated with an observer of the plurality of observers;
   snapping each of the fixations to a nearest grid location of a grid based on a preset resolution;
   clustering together the snapped fixations of the plurality of observers within a pre-selected visual angle of other of the snapped fixations in the electronic display;
   isolating the clustered fixations associated with at least a pre-selected percentage of the plurality of observers;
   removing the fixations that are not part of the isolated clustered fixations;
   expanding the isolated clustered fixations to represent a pre-selected output visual angle; and
   updating the electronic display to highlight the expanded isolated clustered fixations as the distracting features.

2. The method as in claim 1 wherein the pre-selected visual angle comprises a user-selected visual angle.

3. The method as in claim 1 wherein the pre-selected output visual angle comprises a user-selected output visual angle.

4. The method as in claim 1 wherein the step of detecting fixations comprises the step of:
   configuring an electronic automated device for detecting the fixations.

5. The method as in claim 1 further comprising the step of:
   excluding predetermined fixations.

6. The method as in claim 5 wherein the predetermined fixations comprise the first fixation in each trial, the fixations following the successful completion of some task, the fixations affected by drift of the eye tracking device, and the fixations over specified features.

7. The method as in claim 5 wherein the step of automatically expanding comprises the step of:
   adding a border of pre-selected pixel width to the isolated clustered fixations.

8. The method as in claim 7 wherein the pre-selected pixel width comprises a user-selected pixel width.

9. The method as in claim 1 further comprising the step of:
   while forming each cluster, automatically calculating and maintaining a running summation and count of parameters associated with each fixation in each cluster.

10. The method as in claim 9 wherein the parameters comprise a number of unique observers represented by the fixations in each cluster, the duration of each of the fixations in each cluster, the index of each fixation in each cluster, and other measureable, user-specified parameters associated with each fixation in each cluster.

11. The method as in claim 9 further comprising the step of:
after forming each cluster,
automatically calculating the number of unique observers represented by the fixations in each cluster;
automatically calculating statistical measures for each of the parameters calculated for the fixations in each cluster; and
automatically providing the clustered fixation statistics for each of the distracting features.

12. A computer system for analyzing multiple observers' fixations, recorded by a tracking device, over a visual display to determine distracting features comprising:
a detector detecting, from tracking device data from the tracking device, the fixations on the visual display, each of the fixations being associated with one of a plurality of observers;
a cluster processor:
snapping each of the fixations to a nearest grid location of a grid based on a preset resolution, and
clustering together the snapped fixations within a pre-selected visual angle of other of the snapped fixations;
an isolator isolating the clustered fixations associated with at least a pre-selected percentage of the plurality of observers;
a remover removing the fixations that are not part of the processed clustered fixations;
an expander expanding the isolated clustered fixations to represent a pre-selected output visual angle, the expander providing to a chart processor expanded isolated clustered fixations; and
the chart processor updating the visual display to highlight the expanded isolated clustered fixations as the distracting features.

13. The system as in claim 12 wherein the detector comprises computer code on a computer readable medium for:
providing configuration information to the tracking device for detecting the fixations.

14. The system as in claim 12 wherein the excluder comprises computer code on a computer readable medium for:
excluding predetermined of the fixations, where the predetermined of the fixations comprise the first of the fixations in each trial, the fixations following the successful completion of a task, the fixations affected by drift of the tracking device, and the fixations over specified features.

15. The system as in claim 12 wherein the expander comprises computer code on a computer readable medium for creating a border of pre-selected pixel width to isolate the clustered fixations.

16. The system as in claim 12 wherein the cluster processor comprises:
a cluster statistics processor automatically calculating and maintaining parameter statistics associated with each of the fixations in each of the clustered fixations.

17. The system as in claim 16 wherein the parameter statistics comprise:
the number of unique observers represented by the fixations in each of the clustered fixations;
the duration of each of the fixations in each of the clustered fixations;
the index of each of the fixations in each of the clustered fixations; and
other user-specified parameters associated with each of the fixations in each of the clustered fixations.

18. The system as in claim 16 wherein the cluster statistics processor comprises computer code stored on a computer readable medium for:
after forming each of the clustered fixations,
automatically calculating a number of unique observers represented by the fixations in each of the clustered fixations; and
automatically calculating statistical measures for each of the parameters calculated for the fixations in each of the clustered fixations.

19. The system as in claim 12 wherein the cluster processor comprises:
distractions statistics processor automatically providing clustered fixation statistics for each of the distracting features.

* * * * *